(12) United States Patent
Cummins et al.

(10) Patent No.: US 10,809,018 B2
(45) Date of Patent: Oct. 20, 2020

(54) MOUNTING ARRANGEMENT FOR STACKED HEAT EXCHANGER ASSEMBLY

(71) Applicant: DENSO Marston Ltd., West Yorkshire (GB)

(72) Inventors: Craig Cummins, West Yorkshire (GB); James Emery, West Yorkshire (GB)

(73) Assignee: DENSO Marston Ltd., West Yorkshire (GB)

( * ) Notice: Subject to any disclaimer, the term of this patent is extended or adjusted under 35 U.S.C. 154(b) by 177 days.

(21) Appl. No.: 15/828,533

(22) Filed: Dec. 1, 2017

(65) Prior Publication Data

US 2018/0195811 A1 Jul. 12, 2018

(30) Foreign Application Priority Data

Jan. 12, 2017 (GB) .................................. 1700566.1

(51) Int. Cl.
*F28F 9/00* (2006.01)
*F28F 9/007* (2006.01)
*F28D 1/04* (2006.01)
*B60K 11/04* (2006.01)
(Continued)

(52) U.S. Cl.
CPC .............. *F28F 9/002* (2013.01); *B60K 11/04* (2013.01); *F28D 1/0443* (2013.01); *F28F 9/001* (2013.01); *F28F 9/0075* (2013.01); *B60K 11/00* (2013.01); *B60Y 2200/20* (2013.01); *F28D 2021/008* (2013.01); *F28F 2009/004* (2013.01)

(58) Field of Classification Search
CPC .......... F28F 9/002; F28F 9/001; F28F 9/0075; F28F 9/0131; F28F 2009/004; F28F 2265/26; F28F 2275/20; F28F 2280/00; F28F 2280/02; F28F 2206/06; F28F 2280/08; F28F 2280/20; F28F 2280/105; B60K 11/04; B60K 11/00; B60Y 2200/20; F28D 1/0433; F28D 2021/008
See application file for complete search history.

(56) References Cited

U.S. PATENT DOCUMENTS 1,805,101 A * 5/1931 Modine .................. F28D 1/0443
165/122
3,757,853 A * 9/1973 Daman ..................... F01P 3/18
165/76
(Continued)

FOREIGN PATENT DOCUMENTS

FR 2361618 A1 3/1978
JP 2004132564 A 4/2004

*Primary Examiner* — Travis C Ruby (57) ABSTRACT

Two side channels are for mounting the first heat exchanger. Each side channel defines a back and two side walls protruding from the back. An elongate member is at each end of a tank of the first heat exchanger. Each elongate member extends through the tank and being attached at each end to one of the side walls of one of the two channels so that the elongate member spans the channel to mount the first heat exchanger to the channel. The tank includes a recessed region between two parts of the tank and the elongate member extends through an aperture defined in each of the parts, such that an exposed portion of the elongate member is outside the tank. The second heat exchanger is mounted to the exposed portions of two elongate members of the first heat exchanger via connecting unit.

11 Claims, 14 Drawing Sheets

(51) Int. Cl.
*F28D 21/00* (2006.01)
*B60K 11/00* (2006.01)

(56) References Cited

U.S. PATENT DOCUMENTS

| | | | | |
|---|---|---|---|---|
| 3,834,478 A * | 9/1974 | Alexander | B60K 11/04 | 180/68.6 |
| 4,541,645 A * | 9/1985 | Foeldesi | B60K 11/04 | 180/232 |
| 4,619,313 A * | 10/1986 | Rhodes | F28F 9/001 | 165/149 |
| 4,763,723 A * | 8/1988 | Granetzke | B60K 11/04 | 165/149 |
| 5,197,538 A * | 3/1993 | Nagasaka | F25B 40/02 | 165/144 |
| 5,234,051 A * | 8/1993 | Weizenburger | B60K 11/04 | 123/41.31 |
| 5,257,662 A * | 11/1993 | Osborn | F28F 9/001 | 165/149 |
| 5,441,100 A * | 8/1995 | Ueda | B60K 11/04 | 165/149 |
| 5,535,819 A * | 7/1996 | Matsuura | F28F 9/0224 | 165/149 |
| 5,566,748 A * | 10/1996 | Christensen | F02B 29/0475 | 165/67 |
| 5,975,197 A * | 11/1999 | Kado | F28F 9/001 | 165/149 |
| 6,105,660 A * | 8/2000 | Knurr | F01P 3/18 | 165/140 |
| 6,273,182 B1 * | 8/2001 | Pautler | F28D 1/0435 | 165/140 |
| 6,705,387 B2 * | 3/2004 | Kokubunji | B60K 11/04 | 165/140 |
| 7,147,046 B2 * | 12/2006 | Sanada | F28D 1/0452 | 165/140 |
| 8,061,410 B2 * | 11/2011 | Machanek | F28D 1/0443 | 165/140 |
| 8,365,809 B2 * | 2/2013 | Sugimoto | F28D 1/0452 | 165/132 |
| 8,561,678 B2 * | 10/2013 | Richardson | F28D 1/05383 | 165/173 |
| 8,561,679 B2 * | 10/2013 | Richardson | F28D 1/05383 | 165/149 |
| 9,316,449 B2 * | 4/2016 | Richardson | F28D 1/05383 | |
| 2003/0127214 A1 * | 7/2003 | Sugimoto | B23K 1/0012 | 165/67 |
| 2003/0159805 A1 * | 8/2003 | Muhammad | B21D 53/085 | 165/76 |
| 2004/0069446 A1 * | 4/2004 | Horiuchi | F28D 1/0443 | 165/43 |
| 2004/0200598 A1 * | 10/2004 | Hitt | B60K 11/04 | 165/69 |
| 2005/0217832 A1 * | 10/2005 | Sanada | F28D 1/0452 | 165/140 |
| 2006/0213640 A1 * | 9/2006 | Matsuoka | B62D 25/084 | 165/67 |
| 2007/0062671 A1 * | 3/2007 | Sugimoto | F28D 1/0452 | 165/67 |
| 2007/0074848 A1 * | 4/2007 | Andritter | F01P 11/08 | 165/51 |
| 2007/0251669 A1 * | 11/2007 | Hamida | B60K 11/04 | 165/67 |
| 2008/0131230 A1 * | 6/2008 | Burgstein | F02B 29/0456 | 411/342 |
| 2008/0135209 A1 * | 6/2008 | Lowe | B60K 11/04 | 165/77 |
| 2009/0078394 A1 * | 3/2009 | Weatherup | B60K 11/04 | 165/51 |
| 2009/0194352 A1 * | 8/2009 | Plante | B60K 11/04 | 180/294 |
| 2011/0240257 A1 * | 10/2011 | Piggott | F28D 1/05366 | 165/67 |
| 2011/0277976 A1 * | 11/2011 | Richardson | F28D 1/05383 | 165/173 |
| 2012/0118532 A1 * | 5/2012 | Jentzsch | F28F 9/002 | 165/67 |
| 2013/0264039 A1 * | 10/2013 | Kis | F28D 1/0443 | 165/173 |
| 2014/0054006 A1 * | 2/2014 | Richardson | F28D 1/05383 | 165/76 |
| 2016/0109191 A1 * | 4/2016 | Skrzyniarz | F28F 9/001 | 165/47 |
| 2016/0356557 A1 * | 12/2016 | Giordano | F28D 1/0435 | |
| 2017/0023314 A1 * | 1/2017 | Dimmer | F28F 9/0221 | |

\* cited by examiner

MOUNTING ARRANGEMENT FOR STACKED HEAT EXCHANGER ASSEMBLY

CROSS REFERENCE TO RELATED APPLICATION

This application is based on United Kingdom Patent Application No. 1700566.1 filed on Jan. 12, 2017, the disclosure of which is incorporated herein by reference.

TECHNICAL FIELD

The present disclosure relates to a heat exchanger assembly. The present disclosure further relates to a kit of parts for mounting a heat exchanger to another heat exchanger.

BACKGROUND

Heat exchangers are used in vehicles, including off highway vehicles. It is known for two heat exchangers to be used in an assembly in such vehicles. Because of the space constraints under the bonnet of such vehicles there is a desire to ensure that the heat exchanger assembly has a compact arrangement.

SUMMARY

Figure 1:
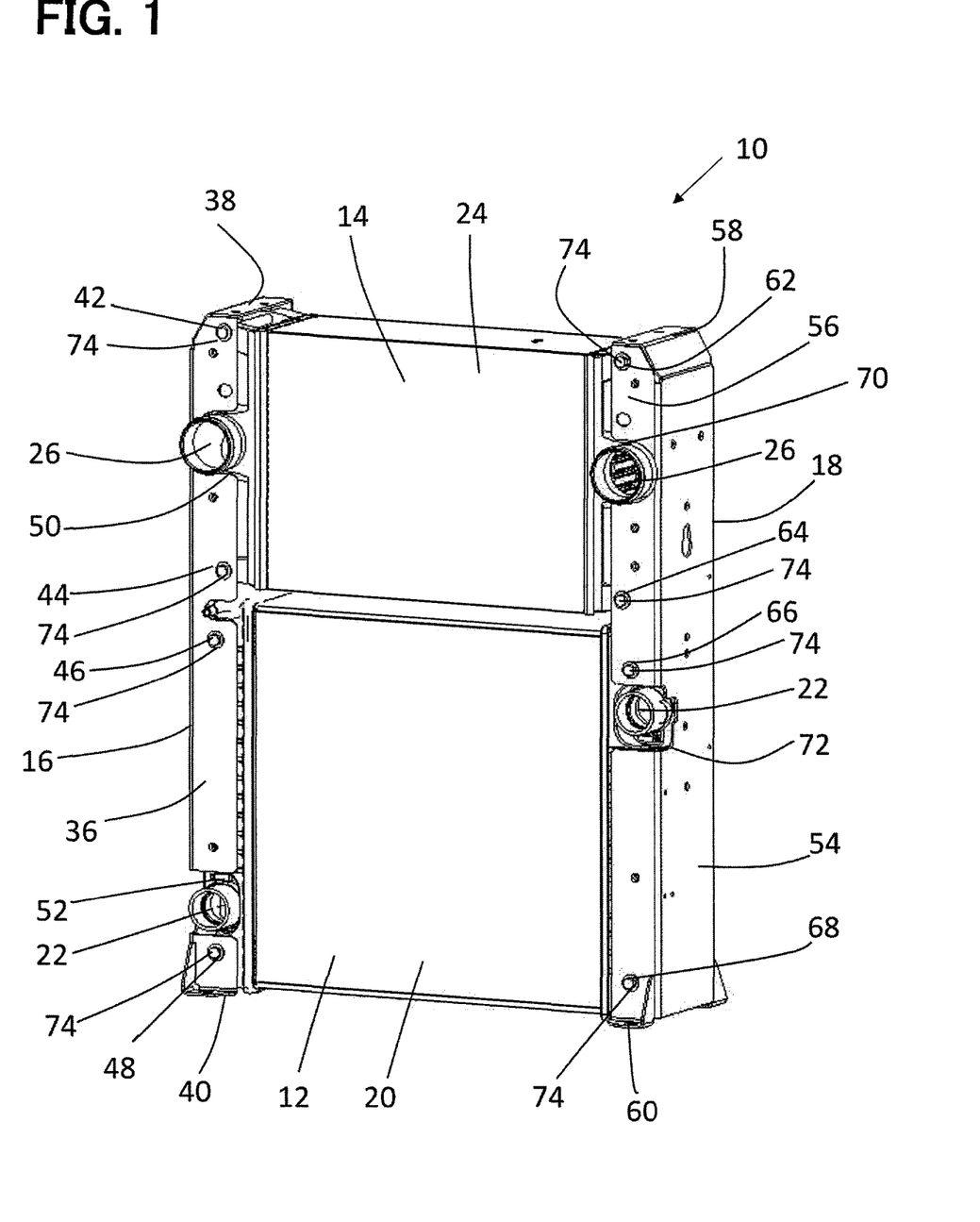
FIG. 1 is a perspective view of an example of a heat exchanger assembly.

As shown in an example of FIG. 1, heat exchanger assemblies that include one or more heat exchangers are mounted to a vehicle by attaching steel side members or channels to the vehicle and then attaching each heat exchanger to the steel side member or channel via a bolted joint. In such heat exchanger assemblies, the heat exchangers are individually mounted on the steel side members or channels using a plurality of fasteners for each heat exchanger, for example four fasteners per heat exchanger.

It is an object of the present disclosure to produce a heat exchanger assembly including heat exchangers and components for mounting the heat exchangers. It is another object to produce a kit of parts for mounting the heat exchangers.

According to an aspect of the present disclosure, a heat exchanger assembly comprises a first heat exchanger with tubes running in a first direction. The heat exchanger assembly further comprises a second heat exchanger with tubes running in a second direction at an angle to the first direction. The heat exchanger assembly further comprises two side channels for mounting the first heat exchanger, each side channel defining a back and two side walls protruding from the back. The heat exchanger assembly further comprises an elongate member at each end of a tank of the first heat exchanger, each elongate member extending through the tank of the first heat exchanger and being attached at each end to one of the side walls of one of the two channels so that the elongate member spans the channel to mount the first heat exchanger to the channel. The tank of the first heat exchanger includes a recessed region between two parts of the tank and the elongate member extends through an aperture defined in each of the parts, such that an exposed portion of the elongate member is outside the tank. The second heat exchanger is mounted to the exposed portions of two elongate members of the first heat exchanger via connecting unit.

According to another aspect of the present disclosure, a kit of parts is for mounting a first heat exchanger with tubes running in a first direction to a second heat exchanger with tubes running in a second direction at an angle to the first direction. The kit of parts comprises two side channels for mounting a first heat exchanger, each side channel defining a back and two side walls protruding from the back. The kit of parts further comprises at least one elongate member for mounting the first heat exchanger to each of the two side channels; the tank of the first heat exchanger including a recessed region defined between two parts of the tank, each part defining an aperture to receive an elongate member. The kit of parts further comprises connecting unit for mounting a second heat exchanger to the at least one elongate member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment

Figure 2:
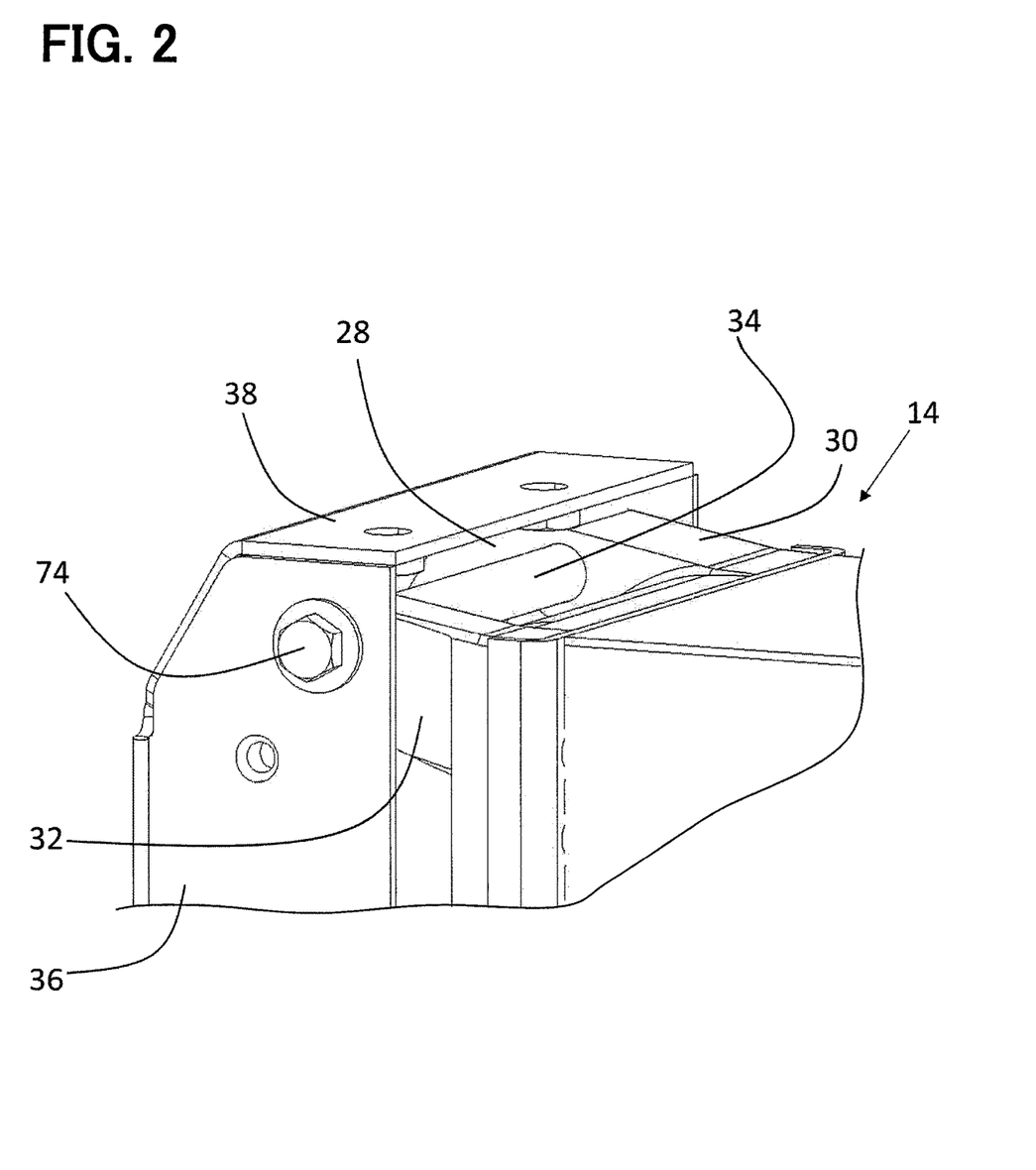
FIG. 2 is a partial perspective view of a part of the heat exchanger assembly of FIG. 1.
Figure 3:
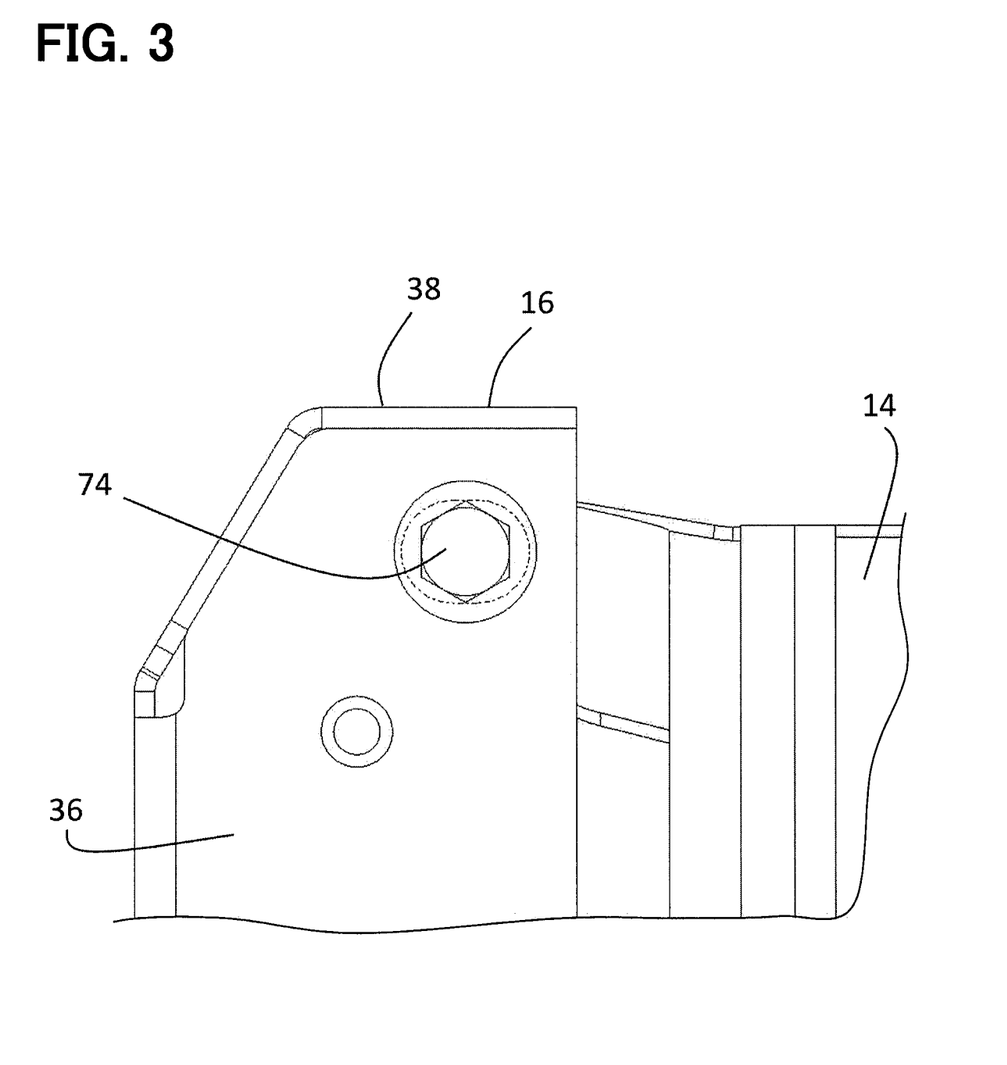
FIG. 3 is a partial side view of the heat exchanger assembly of FIG. 1.

Referring now to FIGS. 1 to 3, there is shown an example of a heat exchanger assembly 10. The heat exchanger assembly 1 includes a first heat exchanger 12, a second heat exchanger 14 and two steel channels or side members 16, 18.

The first heat exchanger 12 comprises a core 20 with a header tank at each end. The core 20 may comprise tubes and fins (not shown). Each header tank includes a broad opening 22 in the form of an inlet or an outlet.

The second heat exchanger 14 similarly comprises a core 24 with a header tank at each end. The core 24 may comprise tubes and fins (not shown). Each header tank includes a broad opening 26 in the form of an inlet or an outlet.

With particular reference to FIG. 2, the header tank of the second heat exchanger 14 includes a recessed region 28 that is defined between two parts or lobes 30, 32 of the header tank. An elongate member in the form of a fastening bar being a bolt with a sleeve 34 extends between the two parts or lobes 30, 32.

Each of the header tanks of the first heat exchanger 12 and the heat exchanger 14 is configured in this way.

The first side channel 16 includes a back, a first side wall 36, a second side wall (not shown), an upper surface 38 and a lower end 40. The side wall 36 includes four slots 42, 44, 46, 48 that are arranged spaced along the length of the side wall 36 between the upper surface 38 and the lower end 40. The slot 42 is proximal to the upper surface 38 of the side channel 16 and the slot 48 is proximal to the lower end 40 of the side channel 16. The side wall 36 also includes a first recessed portion 50 that is positioned between the slot 42 and the slot 44 and a second recessed portion 52 that is positioned between the slot 46 and the slot 48. The second side wall (not shown) also has four slots (not shown) that are arranged to correspond with the arrangement of the slots 42, 44, 46, 48 in the first side wall 36.

The second side channel 18 includes a back 54, a first side wall 56, a second side wall (not shown), an upper surface 58 and a lower end 60. The side wall 56 includes four slots 62, 64, 66, 68 that are arranged spaced along the length of the side wall 56 between the upper surface 58 and the lower end 60. The slot 62 is proximal to the upper surface 58 of the side channel 18 and the slot 68 is proximal to the lower end 60 of the side channel 18. The side wall 56 also includes a first recessed portion 70 that is positioned between the slot 62 and the slot 64 and a second recessed portion 72 that is positioned between the slot 66 and the slot 68. The second side wall (not shown) also has four slots (not shown) that are arranged to correspond with the arrangement of the slots 62, 64, 66, 68 in the first side wall 56.

The heat exchanger assembly 10 is assembled by mounting the first heat exchanger 12 to each of the side channels 16, 18 and passing a fastener 74 in the form of a long bolt with a sleeve through each of the slots 46, 48, 66, 68 in the side walls 36, 56 of the side channels 16, 18, through the corresponding elongate members (not shown) in the header tanks (not shown) of the first heat exchanger 12 and through the slots (not shown) in the second side walls (not shown) of the side channels 16, 18. The second heat exchanger 14 is positioned on top of the first heat exchanger 12 and mounted to the side channels 16, 18 by passing a fastener 74 though each of the slots 42, 44, 62, 64 in the side walls 36, 56 of the side channels 16, 18, through the corresponding elongate members (not shown) in the header tanks (not shown) of the second heat exchanger 14 and through the slots (not shown) in the second side walls (not shown) of the side channels 16, 18.

It can thus be seen that, in the example of the heat exchanger assemblies, it is necessary to use at least four fasteners for each heat exchanger that is mounted in the assembly.

With reference to FIGS. 4 to 13, there is shown a heat exchanger assembly 110 according to a first embodiment of the present disclosure. The heat exchanger assembly 110 includes a first heat exchanger 112, a second heat exchanger 114, a first side channel 116 and a second side channel 118.

Figure 4:
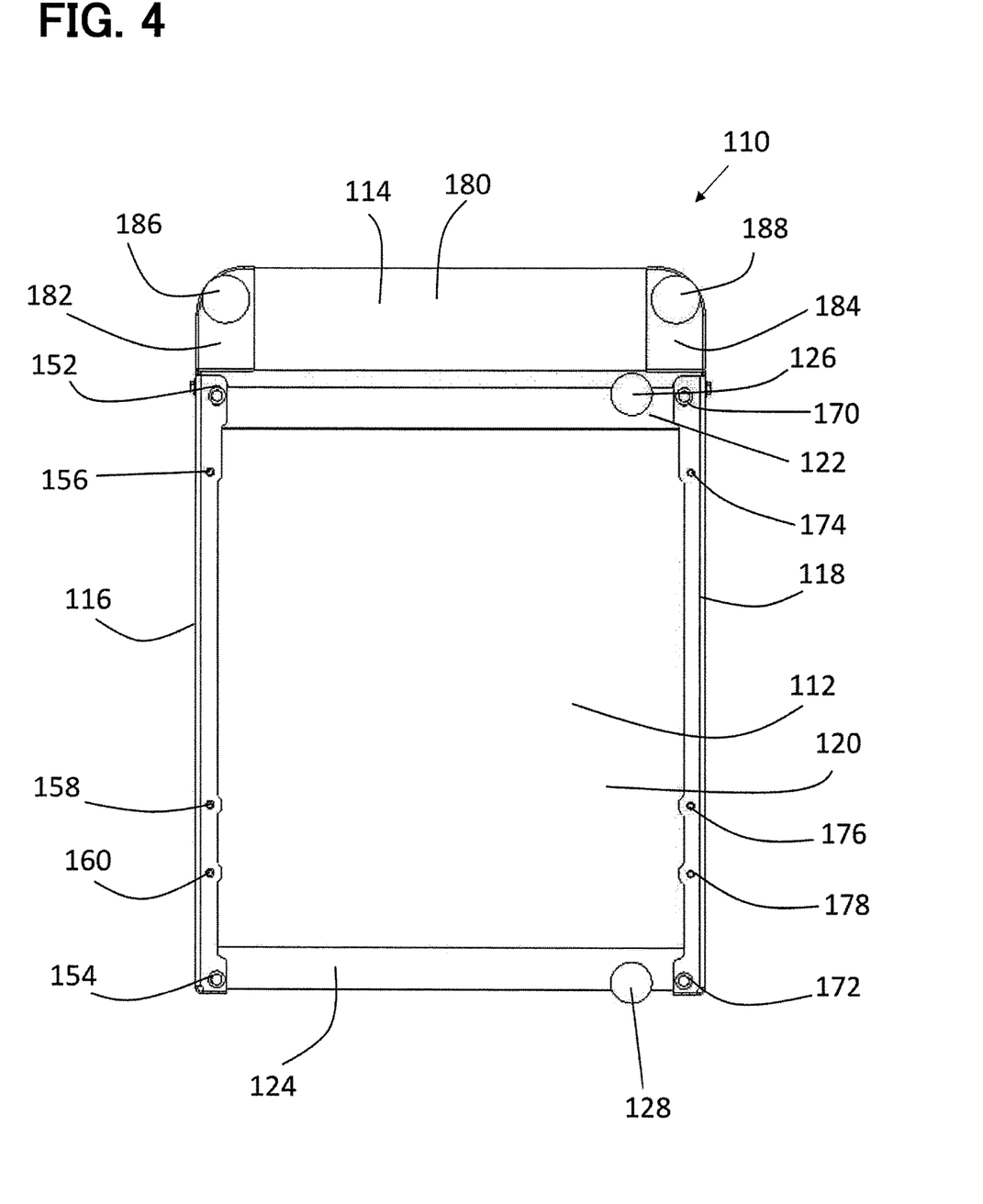
FIG. 4 is a front view of a heat exchanger assembly according to an embodiment of the present disclosure.

The first heat exchanger 112 includes a heat exchanger core 120, a first header tank 122 and a second header tank 124. The core 120 may comprise fins and tubes (not shown) which extend vertically. The first header tank 122 includes a broad opening 126 in the form of an inlet or an outlet. Similarly, the second header tank 124 includes a broad opening 128 in the form of an inlet or an outlet.

Figure 5:
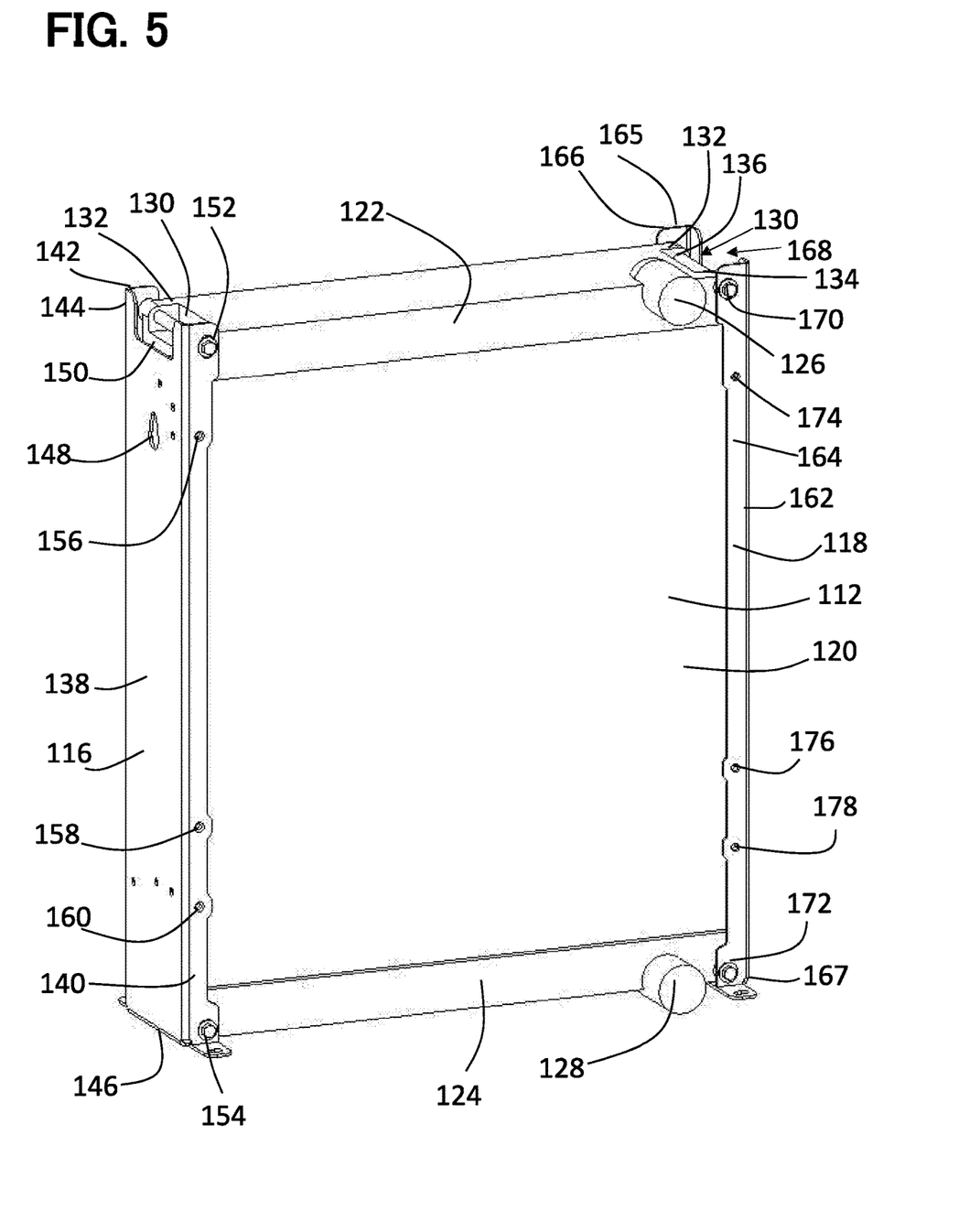
FIG. 5 is a perspective view of part of the heat exchanger assembly of FIG. 4.
Figure 6:
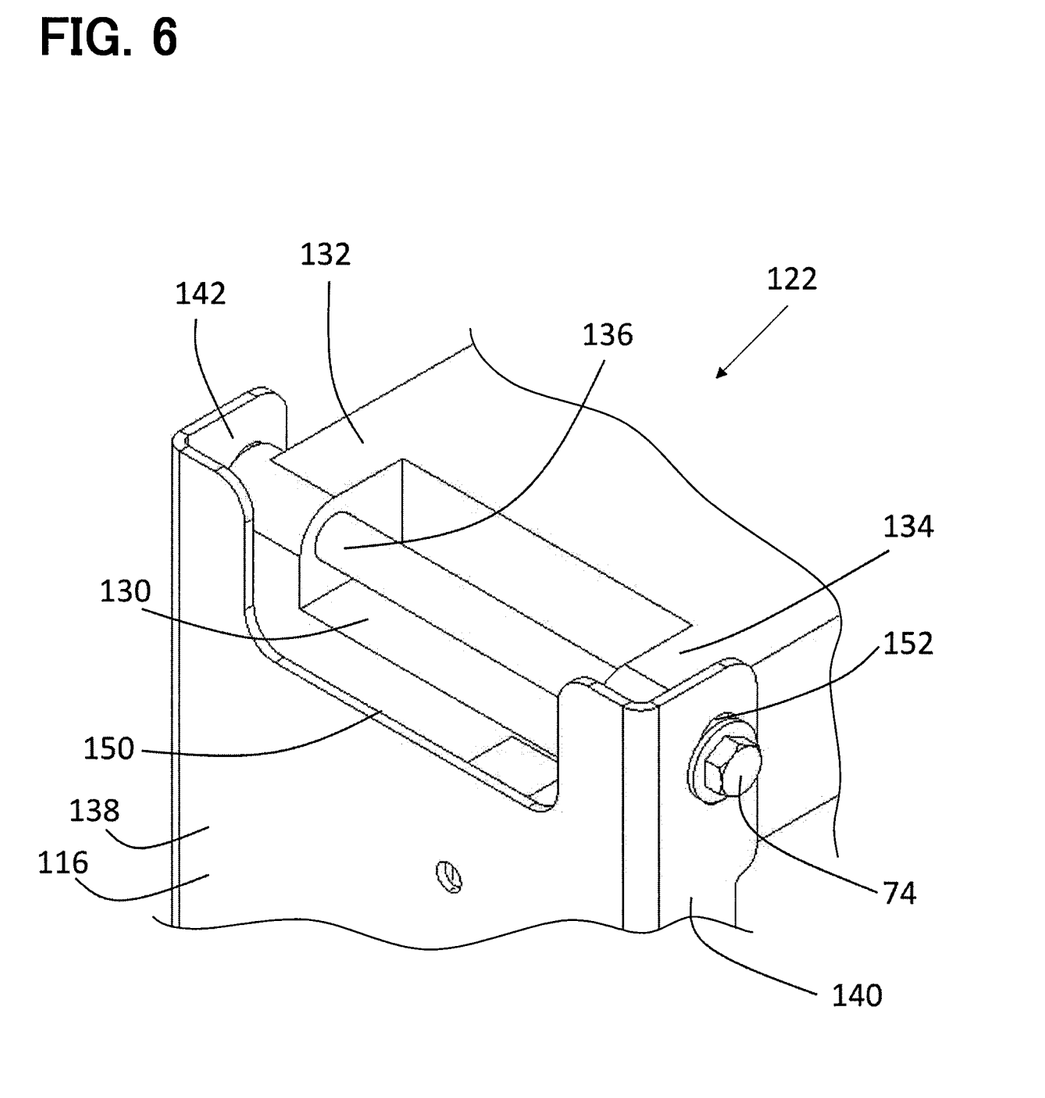
FIG. 6 is a partial perspective view of the heat exchanger assembly of FIG. 4.
Figure 7:
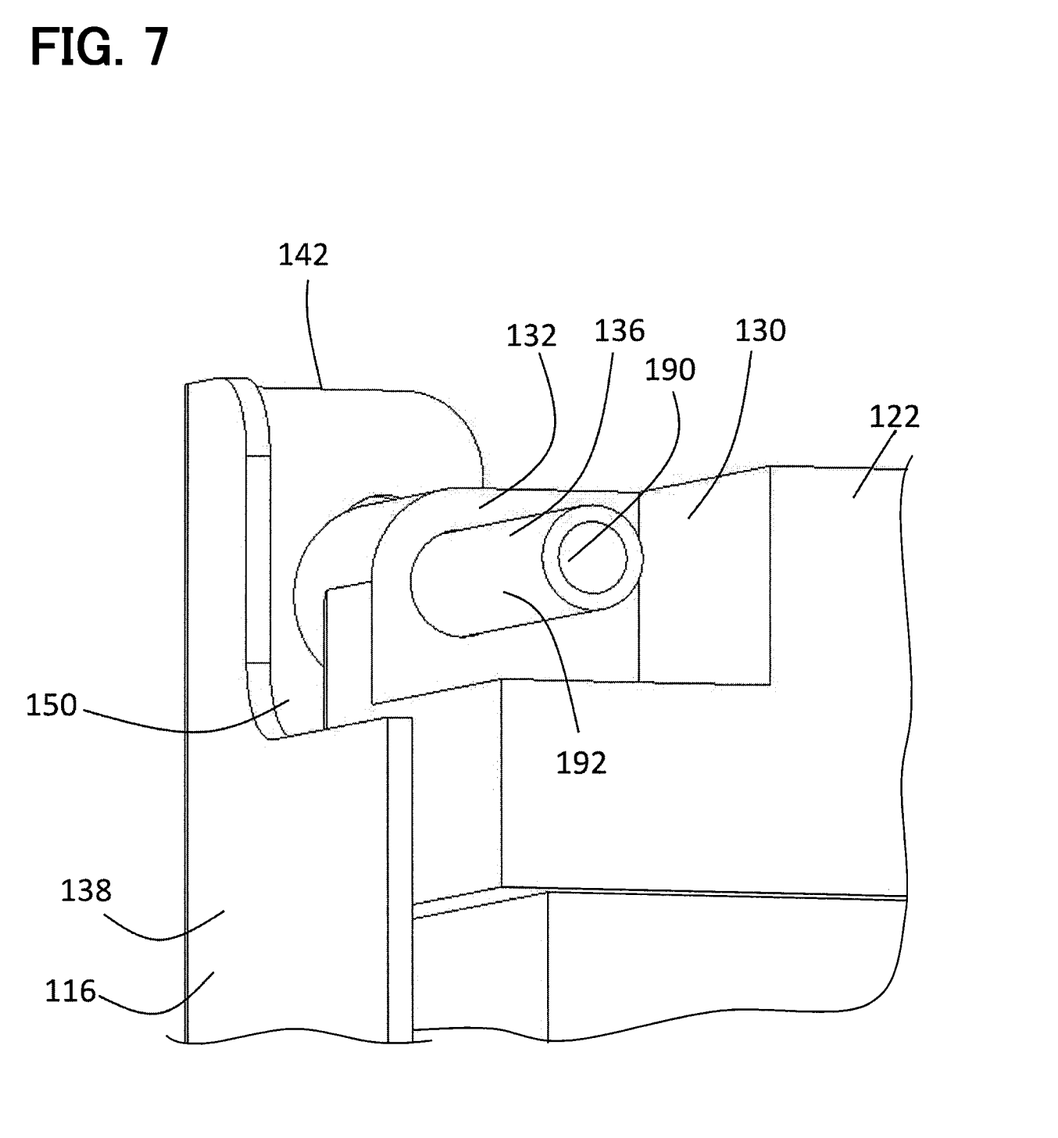
FIG. 7 is a partial perspective view of the heat exchanger assembly of FIG. 4.

With particular reference to FIGS. 5, 6 and 7, at each end of the first header tank 122, there is a recessed portion 130 that is defined between two parts or lobes 132, 134 of the header tank. An elongate member or fastening bar 136 extends between the two parts or lobes 132, 134. A similar mounting arrangement (not shown) is provided at each end of the second header tank 124. As shown in FIG. 7, the elongate member 136 comprises a bolt 190 carrying a sleeve 192.

Figure 12:
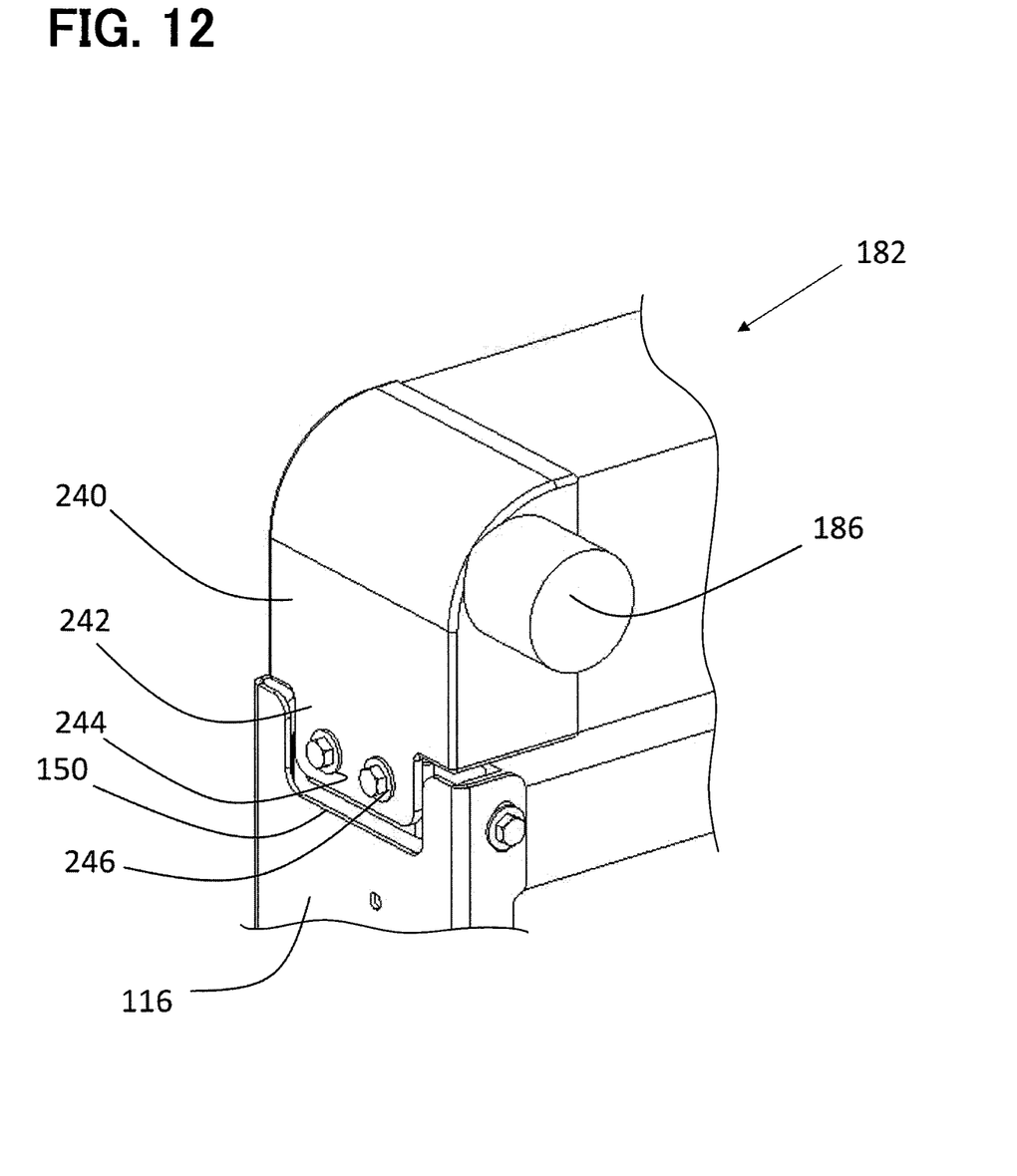
FIG. 12 is a partial perspective view of the heat exchanger assembly of FIG. 4.
Figure 13:
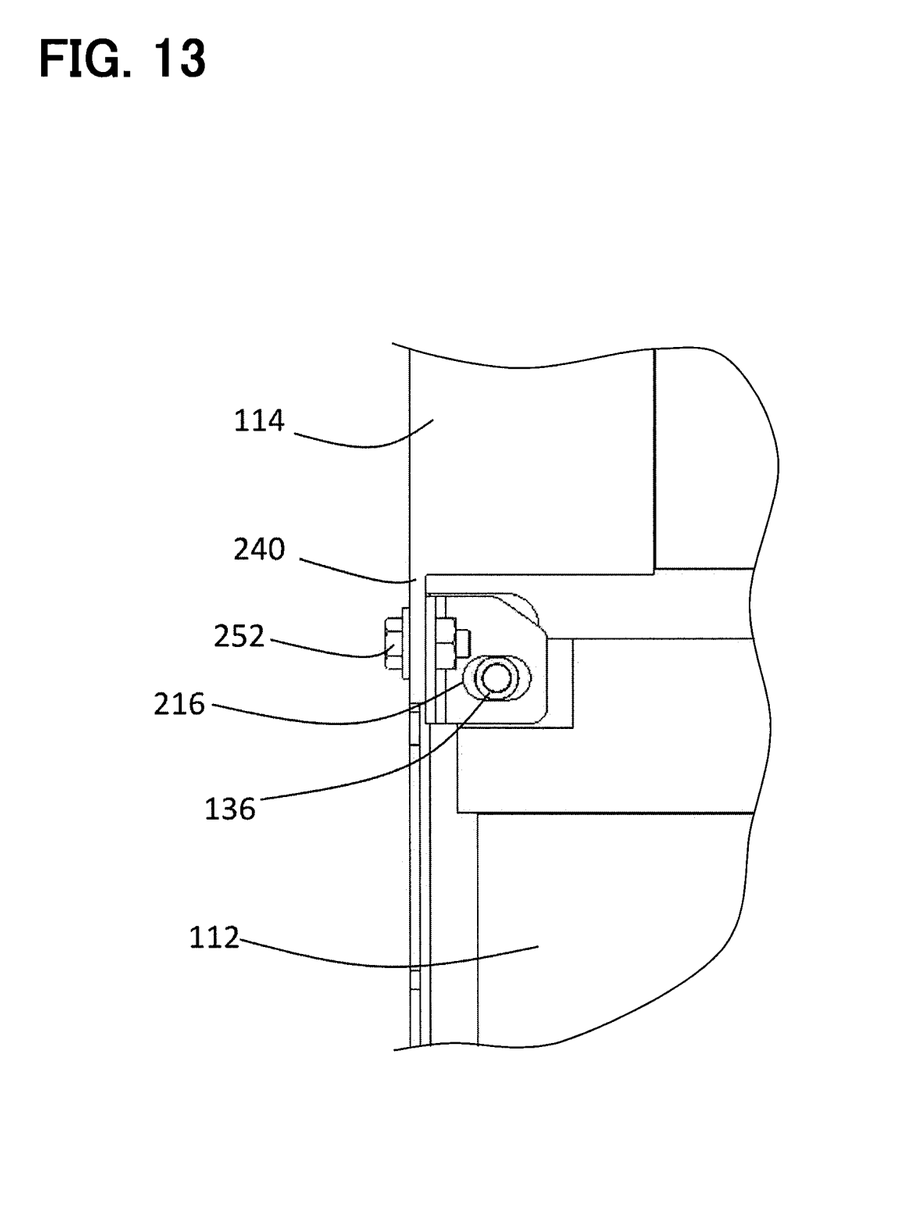
FIG. 13 is a partial front view of the heat exchanger assembly of FIG. 4.

The second heat exchanger 114 includes a heat exchange core 180, a first header tank 182 and a second header tank 184. The core 180 may comprise fins and tubes (not shown). The fins and tubes extend horizontally from left to right as shown in FIG. 4, in other words perpendicular to the fins and tubes of the first heat exchanger 112. The first header tank 182 includes a broad opening 186 in the form of an inlet or an outlet. Similarly, the second header tank 184 includes a broad opening 188 in the form of an inlet or an outlet. With reference to FIG. 12, the first header tank 182 includes a flange 240 that extends downward from the body of the header tank 182. The flange 240 includes a tab portion 242 that has two mounting holes 244, 246. The second header tank 184 includes a flange (not shown) that is configured in the same way as the flange 240 of the first header tank 182.

Figure 8:
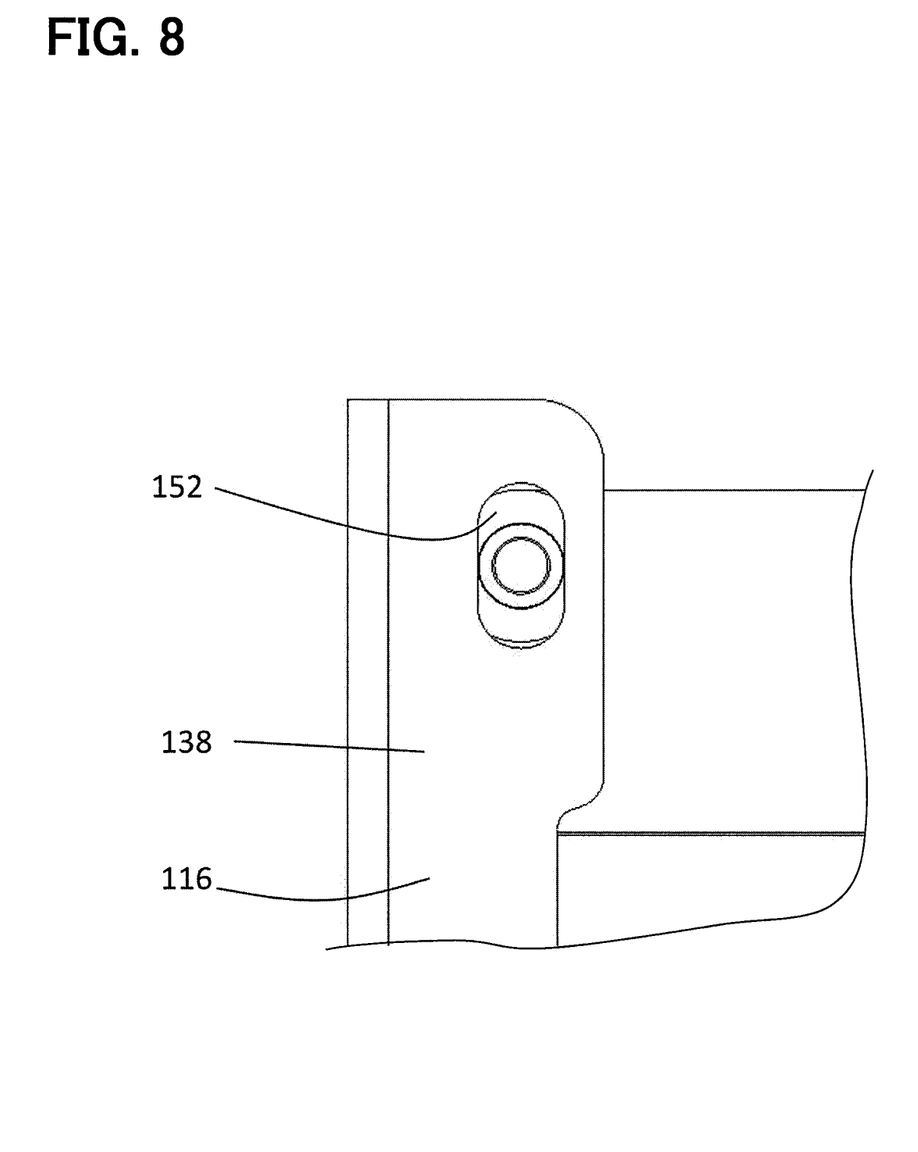
FIG. 8 is a partial front view of the heat exchanger assembly of FIG. 4.
Figure 9:
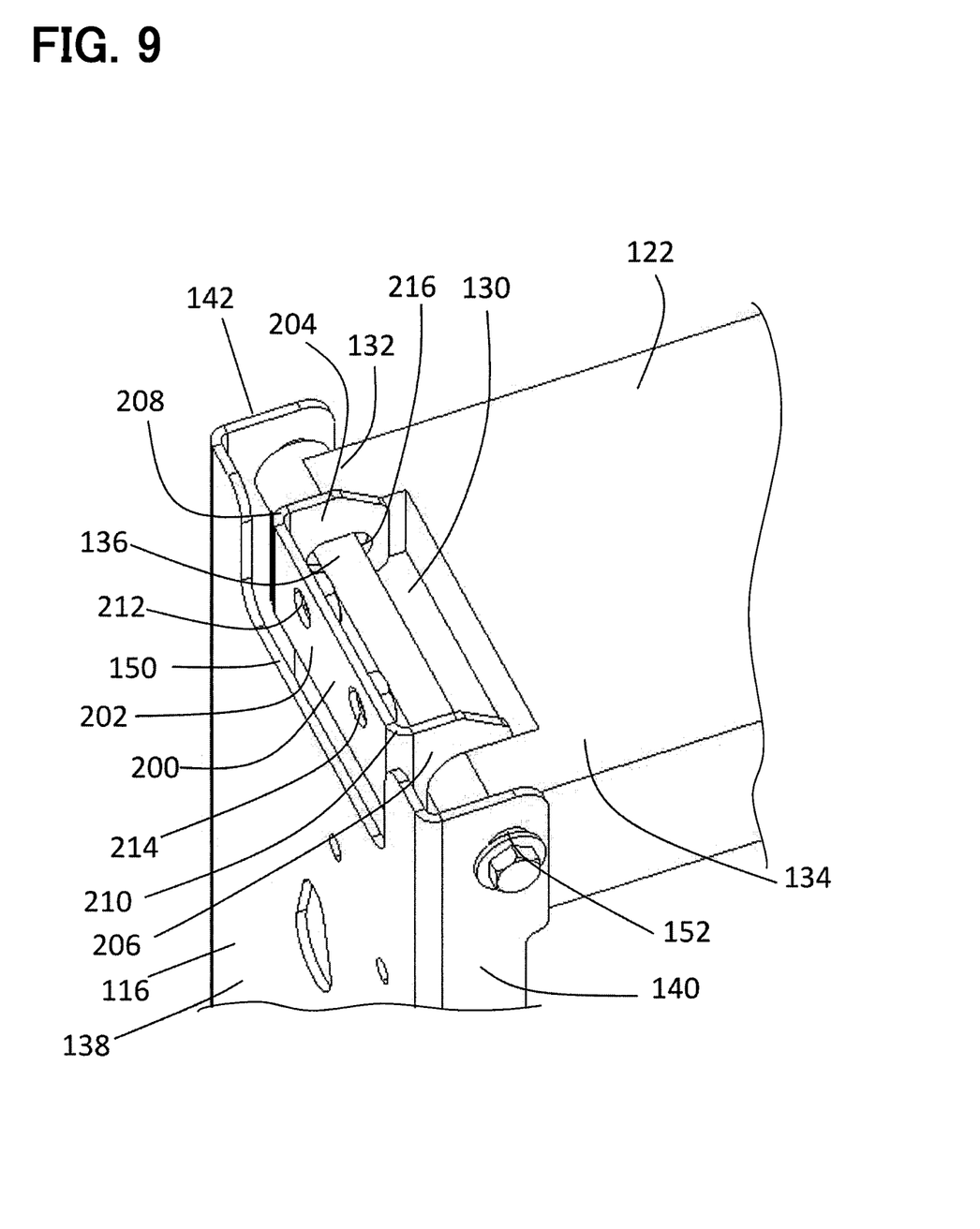
FIG. 9 is a partial perspective view of the heat exchanger assembly of FIG. 4.

The side channel 116 has a back 138, a first side wall 140, a second side wall 142, an upper end 144 and a lower end 146. The back 138 includes a mounting hole 148 and an intrusion 150. The first side wall (channel side wall) 140 includes an upper slot (channel slot) 152 and a lower slot (channel slot) 154 and three mounting holes 156, 158, 160 that are positioned between the upper slot 152 and the lower slot 154. As shown in FIG. 8, the upper slot 152 is oval and has a major axis that extends in a direction that is parallel to the length of the side channel 116. The second side wall (channel side wall) 142 includes two slots (not shown) that are positioned to correspond to the slots 152, 154 in the first side wall 140. The upper slot (not shown) of the second side wall 142 is oval, as described in relation to the upper slot 152 of the first side wall 140.

The side channel 118 has a back 162, a first side wall 164, a second side wall 166, an upper end 165 and a lower end 167. The back 162 includes an intrusion 168. The first side wall 164 includes an upper slot 170, a lower slot 172 and three mounting holes 174, 176, 178 that are positioned between the upper slot 170 and the lower slot 172. The upper slot 172 is oval as described in relation to the upper slot 152 with reference to FIG. 8. The second side wall 166 includes two slots that are positioned to correspond to the slots 170, 172 in the first side wall 164. The upper slot (not shown) of the second side wall 166 is oval, as described in relation to the upper slot 152 of the first side wall 140.

Figure 10:
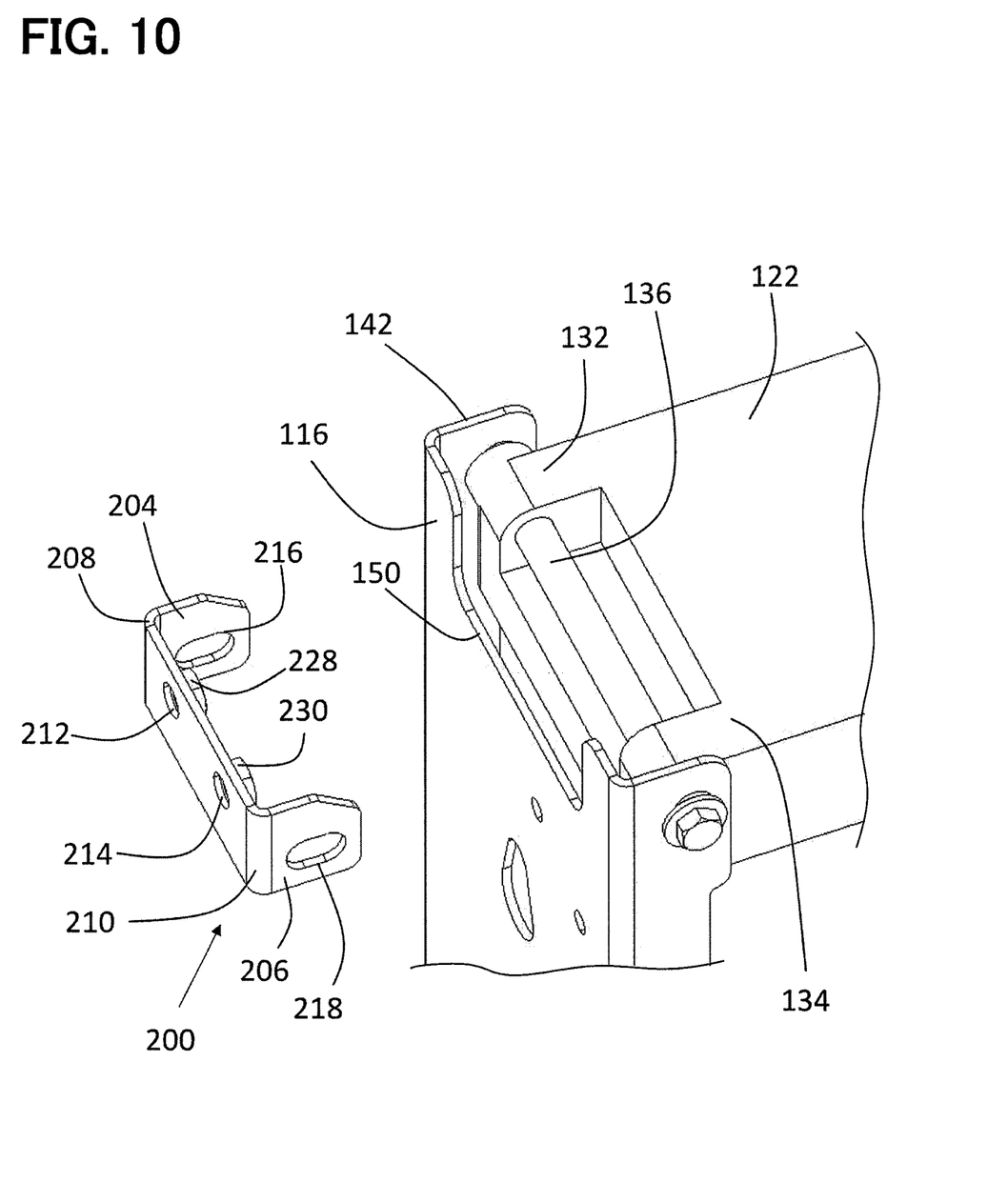
FIG. 10 is a partial perspective view of the heat exchanger assembly of FIG. 4.
Figure 11:
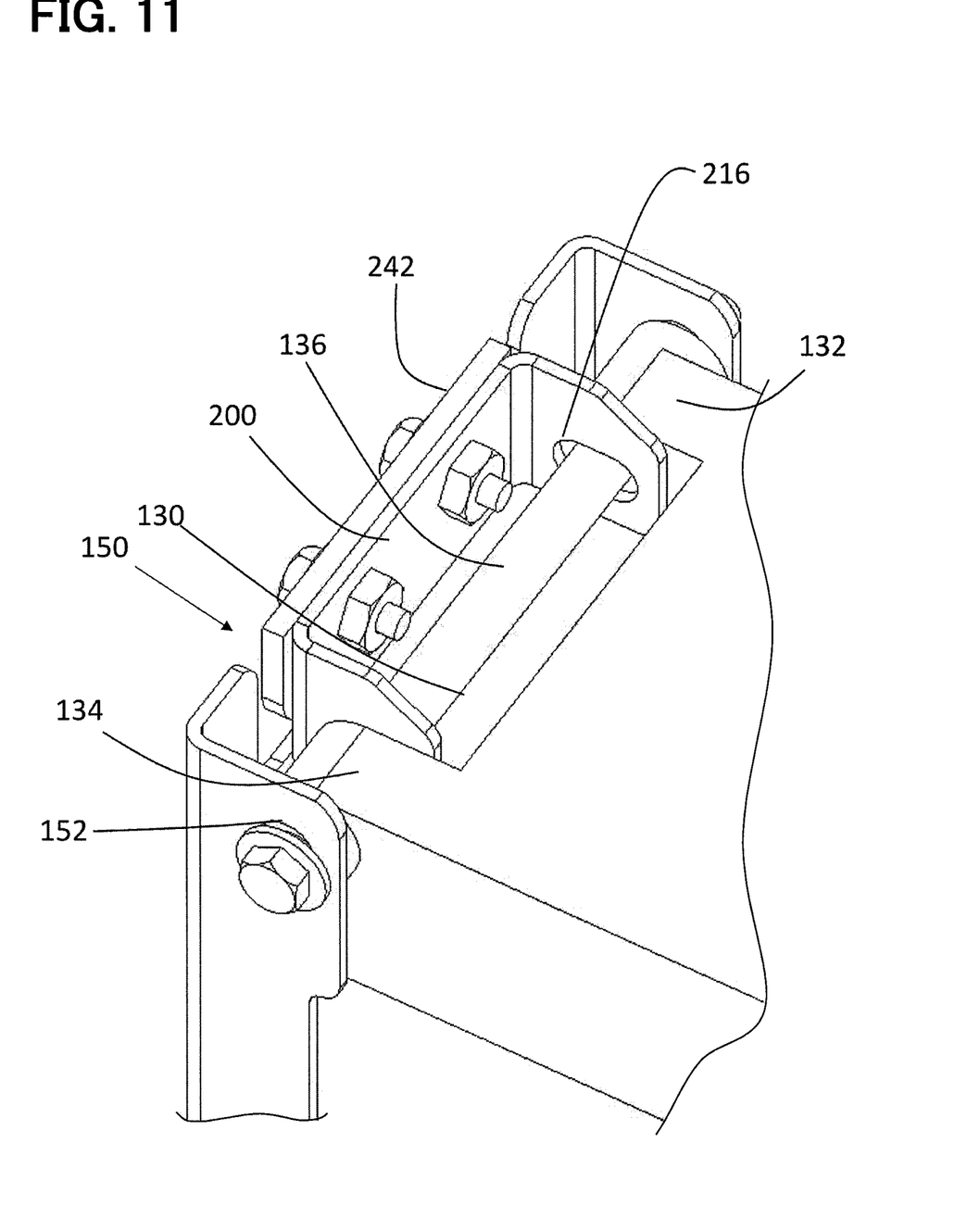
FIG. 11 is a partial perspective view of the heat exchanger assembly of FIG. 4.

The heat exchanger assembly 110 includes connecting unit in the form of a bracket 200 for mounting the second heat exchanger 114 to the first heat exchanger 112, see especially FIG. 10. The bracket 200 includes a plate 202, a first side wall 204 and a second side wall 206. The bracket 200 is formed as a unitary component, with the first side wall 202 extending via a first bend 208 in a direction that is perpendicular to the plate 202 and the second side wall 204 extending via a second bend 210 in a direction that is perpendicular to the plate 202.

With particular reference to FIG. 10, the plate 202 includes two mounting holes 212, 214. The first side wall 204 includes a slot 216 that is oval and has a major axis that extends in a direction that is perpendicular to the plate 202. The second side wall 206 includes a slot 218 that is oval and has a major axis that extends in a direction that is perpendicular to the plate 202. The bracket 200 includes nuts 228, 230 that are positioned adjacent to the mounting holes 212, 214 and are attached to the plate 202.

The heat exchanger assembly 110 is assembled by mounting the first heat exchanger 112 to the two side channels 116, 118. The first heat exchanger 112 is mounted in position by passing fasteners 136 through each of the slots 152, 154, 170, 172, into the hollow bores 190 of the elongate members 136 and through the slots (not shown) in the second side walls 144, 162 of the side channels 116, 118.

A bracket 200 is mounted on each of the upper elongate members 136 by passing the elongate member 136 through the slots 216, 218 in the side walls 204, 206 of the bracket 200.

The second heat exchanger 114 is positioned above the first heat exchanger 112 such that the tab portions 242 of the flanges 240 on each of the header tanks 182, 184 is aligned with the intrusion 150 in each of the side channels 116, 118. The mounting holes 244, 246 of the tab portions 242 are aligned with the mounting holes 212, 214 of the bracket 200 and held in place using screw fasteners 252 into the captive nuts 228, 230.

In this way the heat exchanger assembly 110 has a more compact arrangement than the example of the heat exchanger assemblies and the number of fasteners that are required is reduced (six in the above example, as compared to eight as described in relation to the example of the heat exchanger assemblies). The arrangement of the connecting unit also allows the manufacturing tolerance of the two heat exchangers to be improved and, in the case where the tubes of the heat exchangers run in different directions, accommodates thermal expansion of the tubes in two directions by means of the slots 152, 154, 216, 218.

Figure 14:
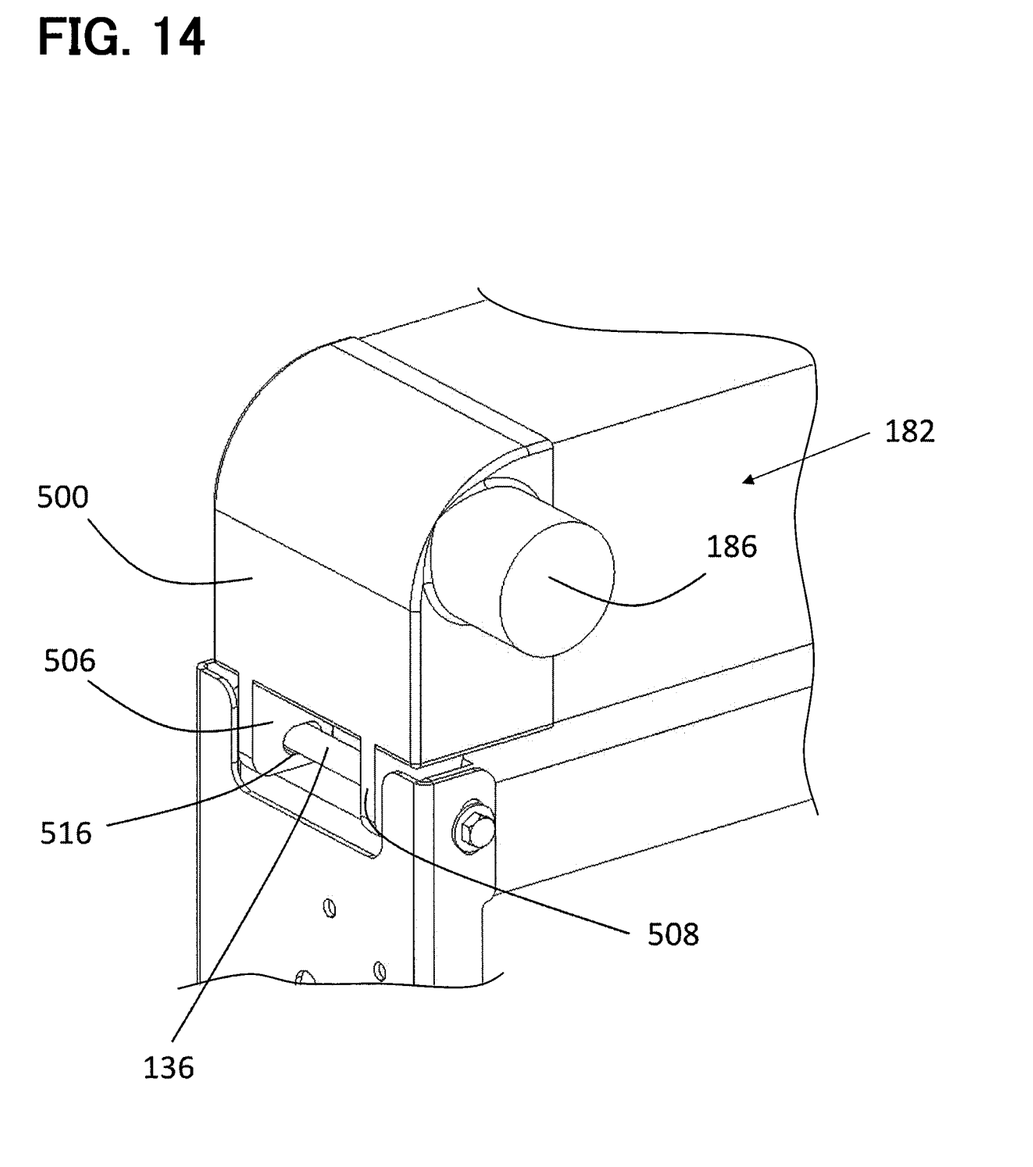
FIG. 14 is a partial perspective view of a heat exchanger assembly according to an alternative embodiment of the present disclosure.

Referring now to FIG. 14, there is shown an alternative embodiment of the present disclosure. In the embodiment of FIG. 14, the bracket 500 is an integral component of the header tank 182. The bracket 500 has side walls 506, 508 that extend downward from the bracket 500 and include slots 516 as described in relation to the bracket 200 of the first embodiment. The integral bracket 500 of this embodiment provides the same advantages as the first embodiment, and further enables a reduction in the number of components that are required since there is no need for a separate bracket 200, or fasteners 252 to mount the second heat exchanger to the bracket.

As described above, there is a provided a heat exchanger assembly comprising a first heat exchanger with tubes running in a first direction; a second heat exchanger with tubes running in a second direction at an angle to the first direction; two side channels for mounting the first heat exchanger, each side channel defining a back and two side walls protruding from the back; and an elongate member at each end of a tank of the first heat exchanger, each elongate member extending through the tank of the first heat exchanger and being attached at each end to one of the side walls of one of the two side channels so that the elongate member spans the channel to mount the first exchanger to the side channel; wherein the tank of the first heat exchanger includes a recessed region between two parts of the tank and the elongate member extends through an aperture defined in each of the parts, such that an exposed portion of the elongate member is outside the tank; and, wherein the second heat exchanger is mounted to the exposed portions of two elongate members of the first heat exchanger via connecting unit.

The heat exchanger assembly provides a more compact design and also enables the number of fasteners within the heat exchanger assembly to be reduced since the first heat exchanger and the second heat exchanger are mounted using two common fasteners, namely the elongate members which may be fastening bars such as bolts with sleeves. The recessed region allows room for the connecting unit to be mounted, while the parts or lobes of the tank carry the elongate members.

The connecting unit may be arranged to permit movement in the elongate direction of the tubes of the second heat exchanger. In this way the manufacturing tolerance in the direction of the tubes of the second heat exchanger, the second direction, is improved and the heat exchanger assembly is configured to allow for thermal expansion in the direction of the tubes of the second heat exchanger (i.e. in the second direction). The connecting unit may define at least one slot to receive each elongate member, each slot being elongate in the said second direction, so that expansion of the tubes of the second heat exchanger can be accommodated by movement of the connecting unit relative to the elongate member.

The connecting unit may be a bracket. The bracket may comprise a plate, a first side wall that extends from a first end of the plate in a direction that is generally perpendicular to the plate, the first side wall including at least one of the at least one slots to receive each elongate member, and a second side wall that extends from a second end of the plate in a direction that is generally perpendicular to the plate, the second side wall including at least one of the at least one slots to receive each elongate member.

The bracket may be formed as a unitary component, the first side wall being connected to the plate via a first bend and the second side wall being connected to the plate via a second bend.

The bracket may be connected to a flange extending from a header tank of the second heat exchanger.

Alternatively, the bracket may be integral with part of the second heat exchanger, for example the bracket may be integral with a header tank of the second heat exchanger.

Each elongate member may be received in a slot in a side wall of the side member or channel, the slot being elongate in the said first direction, so that expansion of the tubes of the first heat exchanger can be accommodated by movement of the elongate member along the slot.

In this way, the manufacturing tolerance in the direction of the tubes of the first heat exchanger is improved and thermal expansion in the first direction is also accommodated.

The tubes of the second heat exchanger may run perpendicular to the tubes of the first heat exchanger.

A back portion of each side channel may define an intrusion to receive the connecting unit.

As described above, there is provided a kit of parts for mounting a first heat exchanger to a second heat exchanger, the kit of parts comprising two side channels for mounting the first heat exchanger, each side channel defining a back and two side walls protruding from the back; at least one elongate member for mounting the first heat exchanger to each of the two side channels; the tank of the first heat exchanger including a recessed region defined between two parts of the tank, each part defining an aperture to receive an elongate member; and connecting unit for mounting a second heat exchanger to the or each elongate member.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A heat exchanger assembly comprising:
    a first heat exchanger with tubes running in a first direction;
    a second heat exchanger with tubes running in a second direction at an angle to the first direction;
    two side channels for mounting the first heat exchanger, each side channel defining a back and two side walls protruding from the back in the first direction of the first heat exchanger; and
    an elongate member at each end of a tank of the first heat exchanger, each elongate member extending through the tank of the first heat exchanger and being attached at each end to one of the side walls of one of the two channels so that the elongate member spans the channel to mount the first heat exchanger to the channel;
    wherein the tank of the first heat exchanger includes a recessed region between two parts of the tank and the elongate member extends through an aperture defined in each of the parts, such that an exposed portion of the elongate member is outside the tank and located within the recessed region; and,
    wherein the second heat exchanger is mounted to the exposed portions of two elongate members of the first heat exchanger via connecting unit.

2. The heat exchanger assembly according to claim 1, wherein the connecting unit is arranged to permit movement in the elongate direction of the tubes of the second heat exchanger.

3. The heat exchanger assembly according to claim 2, wherein the connecting unit defines at least one slot to receive each elongate member, each slot being elongate in the said second direction, so that expansion of the tubes of the second heat exchanger can be accommodated by movement of the connecting unit relative to the elongate member.

4. The heat exchanger assembly according to claim 3, wherein the connecting unit is a bracket.

5. The heat exchanger assembly according to claim 4, wherein the bracket includes:
    a plate,
    a first side wall that extends from a first end of the plate in a direction that is generally perpendicular to the plate, the first side wall including at least one of the at least one slots to receive each elongate member, and
    a second side wall that extends from a second end of the plate in a direction that is generally perpendicular to the plate, the second side wall including at least one of the at least one slots to receive each elongate member.

6. The heat exchanger assembly according to claim 5, wherein the bracket is formed as a unitary component, the first side wall being connected to the plate via a first bend and the second side wall being connected to the plate via a second bend.

7. The heat exchanger assembly according to claim 4, wherein the bracket is connected to a flange extending from a header tank of the second heat exchanger.

8. The heat exchanger assembly according to claim 1, wherein each elongate member is received in a channel slot in a channel side wall of the channel, the slot being elongate in the said first direction, so that expansion of the tubes of the first heat exchanger can be accommodated by movement of the elongate member along the slot.

9. The heat exchanger assembly according to claim 1, wherein the tubes of the second heat exchanger run perpendicular to the tubes of the first heat exchanger.

10. The heat exchanger assembly according to claim 1, wherein a back portion of each side channel defines an intrusion to receive the connecting unit.

11. The heat exchanger assembly according to claim 1, further comprising:
    the connecting unit attached to each of the exposed portions.

* * * * *

UNITED STATES PATENT AND TRADEMARK OFFICE
CERTIFICATE OF CORRECTION

Page 1 of 1

PATENT NO. : 10,809,018 B2
APPLICATION NO. : 15/828533
DATED : October 20, 2020
INVENTOR(S) : Craig Cummins and James Emery It is certified that error appears in the above-identified patent and that said Letters Patent is hereby corrected as shown below:

On the Title Page

Under abstract "11 Claims, 14 Drawing Sheets" should read --13 Claims, 14 Drawing Sheets--

In the Claims

Column 8, Claim 7, Line 26, after ".", insert --¶ 8. The heat exchanger assembly according to claim 4, wherein the bracket is integral with part of the second heat exchanger. ¶ 9. The heat exchanger assembly according to claim 8, wherein the bracket is integral with a header tank of the second heat exchanger.--

Column 8, Claim 8, Line 27, delete "8", insert --10--

Column 8, Claim 9, Line 33, delete "9", insert --11--

Column 8, Claim 10, Line 36, delete "10", insert --12--

Column 8, Claim 11, Line 39, delete "11", insert --13--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*